United States Patent [19]

Surka

[11] Patent Number: 5,276,315
[45] Date of Patent: Jan. 4, 1994

[54] METHOD AND APPARATUS FOR PROCESSING LOW RESOLUTION IMAGES OF DEGRADED BAR CODE SYMBOLS

[75] Inventor: Stefan Surka, Sandy Hook, Conn.

[73] Assignee: United Parcel Service of America, Inc., Atlanta, Ga.

[21] Appl. No.: 883,004

[22] Filed: May 14, 1992

[51] Int. Cl.⁵ .............................................. G06K 7/10
[52] U.S. Cl. .................... 235/462; 235/472; 235/384; 235/494
[58] Field of Search ................ 235/462, 472, 384, 494

[56] References Cited

U.S. PATENT DOCUMENTS

| | | |
|---|---|---|
| 3,410,991 | 11/1968 | van Berkel . |
| 3,833,882 | 9/1974 | Busby . |
| 4,473,746 | 9/1984 | Edmonds . |
| 4,648,120 | 3/1987 | Chittineni . |
| 4,749,879 | 6/1988 | Peterson et al. . |
| 4,797,943 | 1/1989 | Murayama et al. . |
| 4,873,426 | 10/1989 | Sarna et al. . |
| 4,958,064 | 9/1990 | Kirkpatrick . |
| 4,973,829 | 11/1990 | Ishida et al. . |
| 4,988,852 | 1/1991 | Krishnan . |
| 4,992,650 | 2/1991 | Somerville . |
| 5,036,182 | 7/1991 | Ouchi et al. . |
| 5,045,677 | 9/1991 | Okamura . |
| 5,073,954 | 12/1991 | Van Tyne et al. . |
| 5,073,958 | 12/1991 | Imme . |
| 5,081,689 | 1/1992 | Meyer et al. . |
| 5,120,940 | 6/1992 | Willsie . |
| 5,142,592 | 8/1992 | Moler . |
| 5,155,343 | 10/1992 | Chandler et al. . |
| 5,155,344 | 10/1992 | Fardeau et al. . |

FOREIGN PATENT DOCUMENTS

| | | |
|---|---|---|
| 0449634 | 10/1991 | European Pat. Off. . |
| 0449645 | 10/1991 | European Pat. Off. . |
| 0450878 | 10/1991 | European Pat. Off. . |
| 0026623 | 3/1978 | Japan . |
| 0052779 | 3/1986 | Japan . |
| 0162181 | 7/1987 | Japan . |
| 0123179 | 5/1988 | Japan . |

OTHER PUBLICATIONS

"Image Enhancement Processing", E. M. Winter, IBM Technical Disclosure Bulletin, vol. 19, No. 5, Oct. 1986.
"Two Sensor Bar Code Scanner Using Sensor Spacer As A Reference" R. J. Kulikowski and R. G. Pierlott, III, IBM Technical Bulletin, vol. 17, 12-74.

Primary Examiner—Harold Pitts
Attorney, Agent, or Firm—James A. Drobile; William H. Murray; Daniel H. Golub

[57] ABSTRACT

A system is disclosed for processing a two dimensional digital image representative of a bar code symbol. The bar code symbol is oriented in a bar direction. The system includes means for dividing the two dimensional image into a plurality of two dimensional sections perpendicular to the bar direction. Means for determining information representative of the intensity of a plurality of such sections is also provided. A one dimensional intensity projection signal is formed from the determined information. The system also includes means for calculating the areas of a plurality of regions described by the projection signal. The widths of a plurality of bars in the bar code symbol are determined from the calculated areas.

14 Claims, 23 Drawing Sheets

METHOD AND APPARATUS FOR PROCESSING LOW RESOLUTION IMAGES OF DEGRADED BAR CODE SYMBOLS

FIELD OF THE INVENTION

This invention relates to the reading and processing of package labels generally and particularly to systems for locating and extracting bar codes and other symbols from low resolution, noisy or cluttered images.

BACKGROUND OF THE INVENTION

Package handling and sorting operations often require recognition systems for reading bar codes and other symbols which have been affixed to packages. Some types of sorting equipment, for example, use bar code recognition systems to sort packages in accordance with information which has been included in the bar code symbol.

Overhead CCD scanner systems have employed stationary reading devices to scan labels affixed to moving packages. Such devices typically include a linear array of photosensitive cells aligned orthogonally to the motion of the package and a lens system for projecting the image at a scanning window onto the linear array. The cells of the array are scanned at a rate which is relatively high compared to the motion of the package through the read station. The images produced by such scanning equipment are often noisy and of low resolution.

Overhead CCD scanning systems which employ linear arrays and bar code laser scanners typically do not accurately determine the location and/or orientation of a bar code symbol affixed to a moving package. In high speed package sorting operations, this problem is exacerbated by the fact that individual bar code symbols, which are affixed to packages on a moving belt, will typically not have a common alignment or orientation.

A further complication to reading a bar code symbol is introduced when the symbol is embedded against a cluttered background on the moving package. The cluttered background can result from other information, besides the bar code symbol being scanned, which has been placed on the package in close proximity to the bar code symbol. A cluttered or noisy image can also result from stray marks on the package near the bar code symbol, or from a torn, smudged, or mutilated bar code symbol.

It is an object of the present invention to provide a system for reading bar code symbols of varying orientation which are affixed to packages on a moving belt.

It is a further object of the present invention to provide a system for reading bar code symbols embedded against a noisy or cluttered background using low resolution scanning equipment.

It is a still further object of the present invention to provide a system for locating within an intensity image varying types of objects or symbols including bar codes, stacked bar codes, square arrays and hexagonal arrays.

It is a still further object of the present invention to provide a system for determining the orientation within an intensity image of varying types of objects or symbols including bar codes, stacked bar codes, square arrays and hexagonal arrays.

It is a still further object of the present invention to provide a system for determining bar widths from a two dimensional image representative of a degraded or corrupted bar code symbol.

Further objects and advantages of the invention will become apparent from the description of the invention which follows.

SUMMARY OF THE INVENTION

A system is disclosed for processing a two dimensional digital image representative of a bar code symbol. The bar code symbol is oriented in a bar direction. The system includes means for dividing the two dimensional image into a plurality of two dimensional sections perpendicular to the bar direction. Means for determining information representative of the intensity of a plurality of such sections is also provided. A one dimensional intensity projection signal is formed from the determined information. The system also includes means for calculating the areas of a plurality of regions described by the projection signal. The widths of a plurality of bars in the bar code symbol are determined from the calculated areas.

DETAILED DESCRIPTION OF THE PREFERRED EMBODIMENT

The present invention is directed to a system for locating an object within an intensity image, a system for determining the orientation and position of an object within an intensity image and a system for image processing. The object locating system is discussed in connection with FIGS. 1-8; the object orientation system is discussed in connection with FIG. 9; and the image processing system is discussed in connection with FIGS. 10-12E. As used herein, the term "object" refers to symbols, figures, patterns, shapes or areas having dense edges. Without limitation, the term "object" includes bar code symbols, stacked bar code symbols, and arrays of squares, hexagons and other polygons.

Object Locating System

Figure 1:
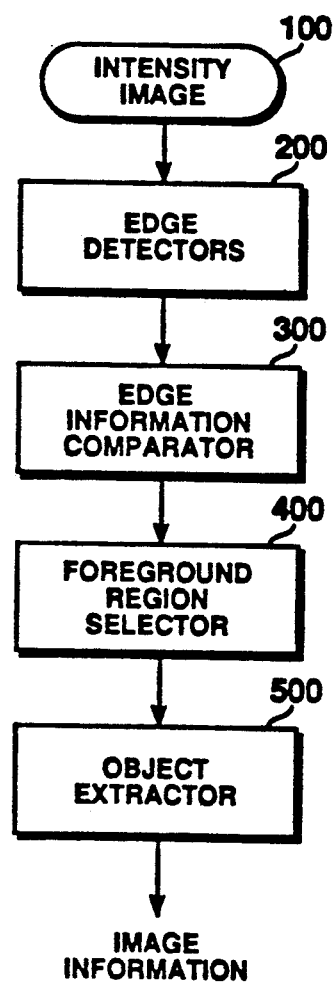
FIG. 1 is a flow diagram illustrating the operation of a preferred embodiment of a system for locating an object in an intensity image according to the present invention.

Referring now to FIG. 1, there is shown a flow diagram illustrating the operation of a preferred embodiment of a system for locating an object in an intensity image according to the present invention. The system accepts as its input intensity image 100 which is preferably a digitized gray scale representation of an imaged region being scanned. In the preferred embodiment, intensity image 100 is a low resolution image derived from a linear array of CCDs. The system shown includes means 200 for analyzing an intensity image with at least two different edge detectors to detect a multiplicity of edges oriented in at least two directional ranges. Means 300 is provided for comparing information representative of detected edges angularly oriented in a first of said at least two directional ranges and information representative of detected edges angularly oriented in a second of said at least two directional ranges. Based on the results of comparisons made by means 300, means 400 selects at least one foreground region from intensity image 100 wherein detected edges are angularly oriented substantially in accordance with a target orientation. In the preferred embodiment, means 500 is provided for extracting image information representative of a located object from intensity image 100.

Figure 2A:
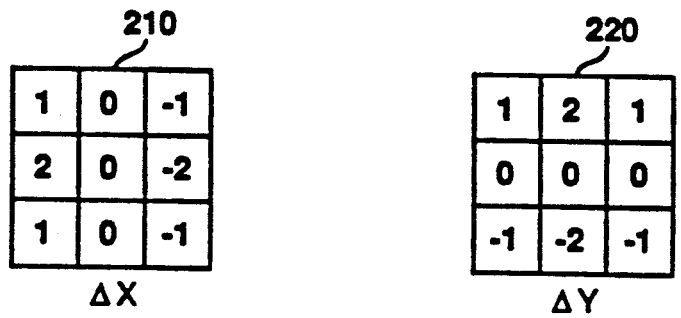
FIG. 2A shows two edge detectors used in connection with a preferred embodiment of the present invention.

Referring now to FIG. 2A, there are shown two edge detectors 210, 220 which are employed by means 200 in connection with a preferred embodiment of the present invention. In a preferred embodiment, means 200 applies edge detector 210 to intensity image 100 on a pixel by pixel basis to determine the X component ($\Delta X$) of each edge gradient. Similarly, edge detector 220 is applied to intensity image 100 on a pixel by pixel basis to determine the Y component ($\Delta Y$) of each edge gradient. Based on this X and Y component information, means 200 determines edge magnitude information ($M_n$) and direction information ($D_n$) at each pixel in intensity image 100 according to equations (1) and (2) below:

$$M_n = (\Delta X_n^2 + \Delta Y_n^2)^{\frac{1}{2}} \qquad (1)$$

$$D_n = \arctan(\Delta Y_n / \Delta X_n) \qquad (2)$$

In a preferred embodiment, intensity image 100 is formed of 782×1288 8-bit pixels and $M_n$ is normalized to range from 0-127. This normalization is achieved by dividing the result of equation (1) by 8.

Figure 2B:
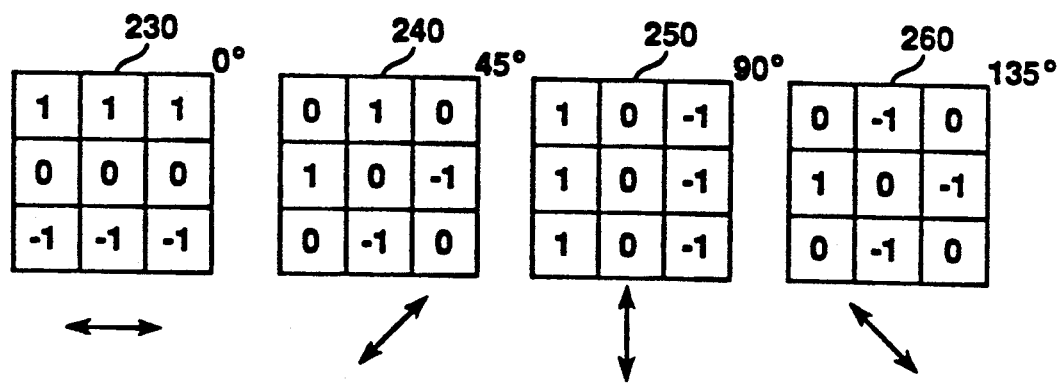
FIG. 2B shows four edge detectors used in connection with a further preferred embodiment of the present invention.

In an alternative preferred embodiment, edge detectors 230, 240, 250, 260 of FIG. 2B are applied by means 200 to determine edge magnitude information and direction information at each pixel in intensity image 100. More particularly, edge detector 230 is applied to intensity image 100 on a pixel by pixel basis to determine magnitude information corresponding to edges angularly oriented in a directional range within 22.5 degrees on either side of the 0 degree axis; edge detector 240 is applied to intensity image 100 on a pixel by pixel basis to determine magnitude information corresponding to edges angularly oriented in a directional range within 22.5 degrees on either side of the 45 degree axis; edge detector 250 is applied to intensity image 100 on a pixel by pixel basis to determine magnitude information corresponding to edges angularly oriented in a directional range within 22.5 degrees on either side of the 90 degree axis; and edge detector 260 is applied to intensity image 100 on a pixel by pixel basis to determine magnitude information corresponding to edges angularly oriented in a directional range within 22.5 degrees on either side of the 135 degree axis.

Edge information from means 200 is next applied to edge information comparator 300. In a preferred embodiment, edge information comparator 300 is comprised of means 310 for generating at least two feature images, means 330 for forming a composite feature image, means 350 for forming a pixel cluster region in a composite feature image.

In a preferred embodiment, means 310 generates at least two feature images by associating the edge magnitude information determined for each pixel in intensity image 100 with one of at least two corresponding directional ranges. In a first preferred embodiment, edge detectors 210, 220 are used to determine the angular orientation of each edge detected from intensity image 100, and each detected edge is then classified as being angularly oriented in one of at least three directional ranges. For example, each detected edge may be classified as being oriented in either (i) a first directional range within 30 degrees on either side of the 0 degree axis, (ii) a second directional within 30 degrees on either side of the 60 degree axis or (iii) a third directional within 30 degrees on either side of the 120 degree axis. For each directional range, means 310 associates the detected edges angularly oriented in that directional range with a corresponding feature image. In a preferred embodiment, each feature image is formed of binary pixels which are used to represent the detected edges which have been associated with that respective feature image. The position of each binary pixel set high (or set white) in a given feature image preferably corresponds to the position in intensity image 100 of the detected edges associated with that feature image.

In an alternate preferred embodiment, each edge detected by detectors 210, 220 is classified as being angularly oriented in one or two of at least three partially overlapping directional ranges. In this embodiment, the preferred degree of overlap is approximately 5 degrees on either side of each directional range, although other amounts of overlap may be used. Thus, each detected edge may be classified as being oriented in (i) a first directional range within 35 degrees on either side of the 0 degree axis, (ii) a second directional range within 35 degrees on either side of the 60 degree axis and/or (iii) a third directional range within 35 degrees on either side of the 120 degree axis. A detected edge will be classified in only one directional range if it is not oriented in one of the overlapping range portions. Similarly, a detected edge will be classified in two directional ranges if it is oriented in an overlapping range portion. As in the paragraph immediately above, for each directional range, means 310 associates the detected edges oriented in that directional range with a corresponding feature image.

In a still further alternate embodiments, means 310 may classify detected edges into other directional ranges of differing size or direction. In addition, at least two and more than three directional ranges may be used to classify the detected edges. For example, edge detectors 230, 240, 250, 260 may be used by means 310 to classify each edge from an imaged region into one of the four directional ranges associated with those edge detectors.

Figure 3:
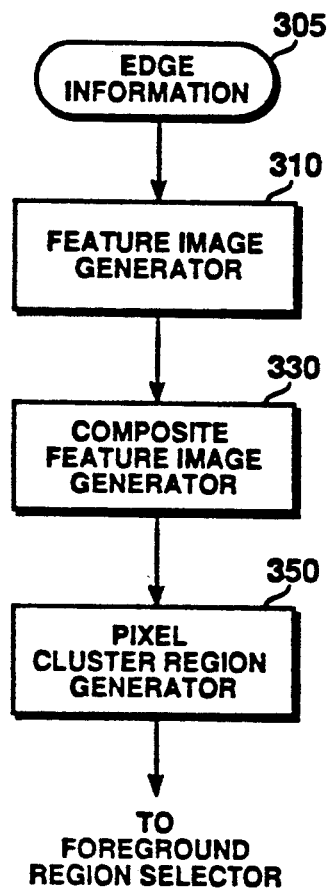
FIG. 3 is a flow diagram illustrating the operation of an edge information comparator according to a preferred embodiment of the present invention.
Figure 3A:
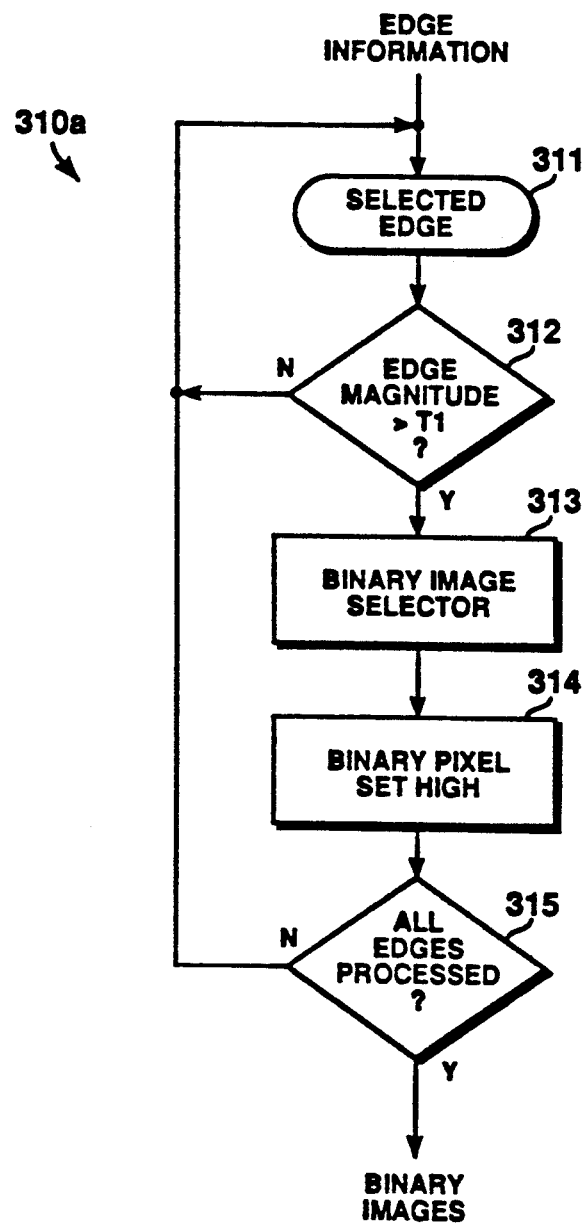
FIG. 3A is a flow diagram illustrating a process for forming binary images according to a preferred embodiment of the present invention.

Means 310 is preferably formed from means 310a for forming at least two binary images and means 310b for generating at least two feature images from the output of means 310a. Referring now to FIG. 3A, there is shown a flow diagram illustrating the operation of means 310a for forming at least two binary images, wherein each of the at least two binary images formed corresponds to one of at least two directional ranges of detected edges. Means 310a accepts as its input magnitude information and directional information for each edge detected by means 200. Means 311 is provided for selecting a detected edge for processing. Means 312 compares the magnitude information corresponding to the selected edge to a first predetermined threshold ($T_1$). If it is determined that the magnitude information corresponding to the selected edge exceeds $T_1$, means 313 selects from at least two directional ranges the one directional range corresponding to the direction of the selected edge. If the magnitude information exceeds $T_1$, means 313 also selects from at least two binary images the one binary image corresponding to the selected directional range. Means 314 then sets high the pixel in the selected binary image which corresponds in position to the position of the selected edge in intensity image 100. Means 315 is provided for repeating this process from means 311 for each detected edge.

In an alternate preferred embodiment used for processing detected edges which are to be classified in one or two of at least three partially overlapping directional ranges, means 313 selects from at least three directional ranges the one or two directional ranges corresponding to the direction of the selected edge. In this embodiment, means 313 also selects from at least three binary images the one or two binary images corresponding to the selected directional range(s). Means 314 then sets high the pixel(s) in the selected binary image(s) which correspond in position to the position of the selected edge in intensity image 100.

In a still further preferred embodiment, means 310 accepts as input magnitude information determined by each of edge detectors 230, 240, 250, 260. The magnitude information corresponding to each detected edge is then compared against $T_1$. For each edge detected by detector 230 with a magnitude exceeding $T_1$, a binary pixel is set high in a first binary image. The position of the binary pixel set high corresponds to the position in intensity image 100 of the edge represented by that binary pixel. Similarly, for each edge detected by detector 240 with a magnitude exceeding $T_1$, a corresponding binary pixel in a second binary image is set high; for each edge detected by detector 250 with a magnitude exceeding $T_1$, a corresponding binary pixel in a third binary image is set high; and for each edge detected by detector 260 with a magnitude exceeding $T_1$, a corresponding binary pixel in a fourth binary image is set high.

Figure 6A:
FIG. 6A shows a exemplary low resolution intensity image representative of an imaged region being scanned.
Figure 6B:
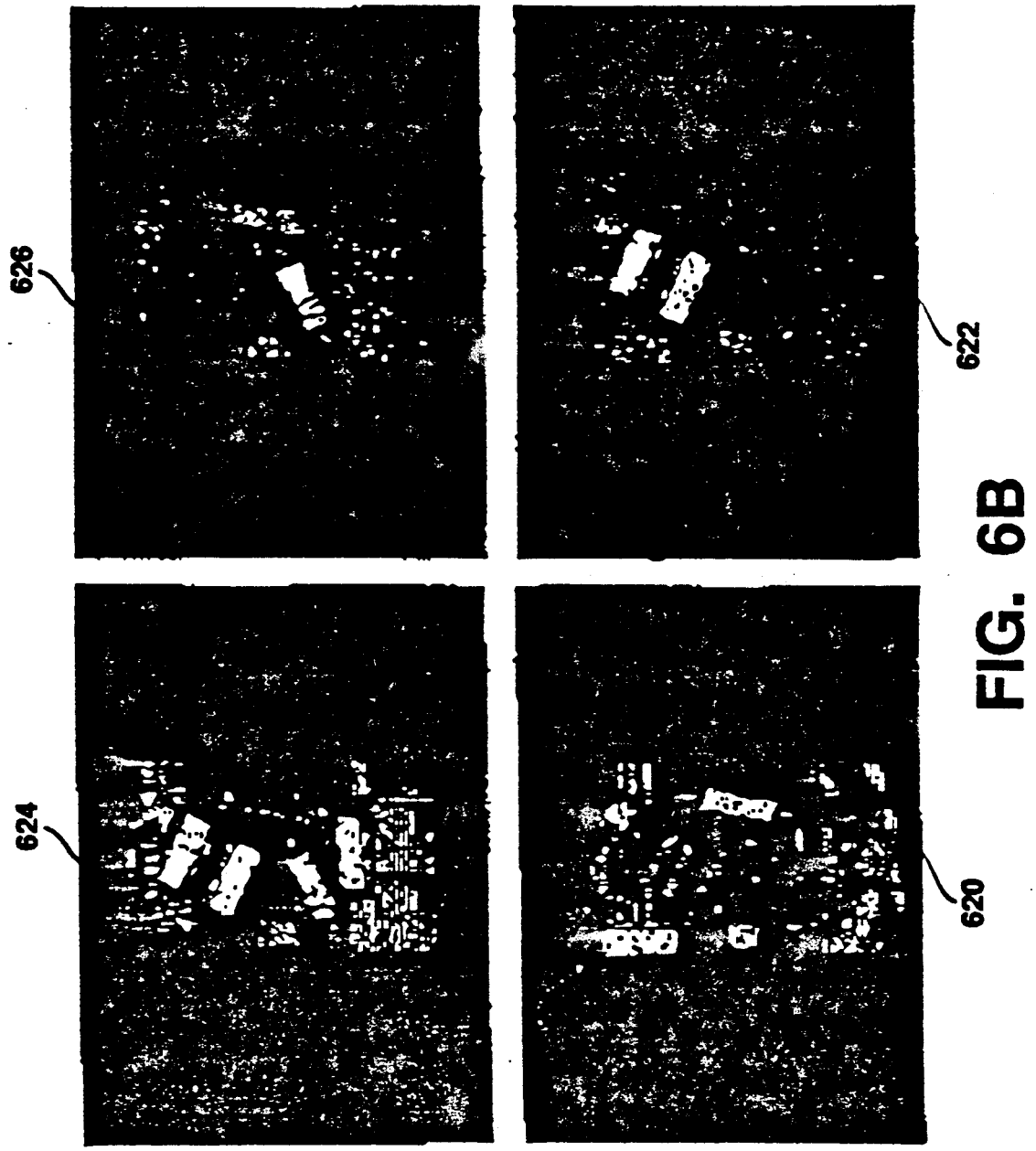
FIG. 6B shows four exemplary binary images which resulted from the application of the edge detectors of FIG. 2B to the intensity image of FIG. 6A.

FIG. 6A shows an exemplary low resolution intensity image (610) for processing by the object locator system of the present invention. FIG. 6B shows four binary images which resulted from application of edge detectors 230, 240, 250, 260 to the intensity image of FIG. 6A. Thus, the white pixels in first binary image 620 represent edges detected by detector 230 with magnitudes exceeding $T_1$ and angular orientations in the directional range within 22.5 degrees on either side of the 0 degree axis; the white pixels in second binary image 62 represent edges detected by detector 240 with magnitudes exceeding $T_1$ and angular orientations in the directional range within 22.5 degrees on either side of the 45 degree axis; the white pixels in third binary image 624 represent edges detected by detector 250 with magnitudes exceeding $T_1$ and angular orientations in the directional range within 22.5 degrees on either side of the 90 degree axis; and the white pixels in fourth binary image 626 represent edges detected by detector 260 with magnitudes exceeding $T_1$ and angular orientations in the directional range within 22.5 degrees on either side of the 135 degree axis.

In a preferred embodiment, means 310b subjects each of the at least two binary images output by means 310a to a filtering process referred to as weighed morphology or "majority dilation/minority erosion". This process is used "dilate" areas in each binary image where the concentration of pixels set high exceeds a second predetermined threshold ($T_2$), and to "erode" areas in each binary image where the concentration of binary pixels set high does not exceed $T_2$. In a preferred embodiment of means 310b, this majority dilation/minority erosion process is also used to simultaneously perform "subsampling" on each binary image. According to this embodiment, each of the at least two binary images is divided into a plurality of regions or blocks. For example, a binary image 782×1288 pixels in dimension would preferably be divided into pixel blocks 8×8 pixels in size. Next, the concentration of binary pixels set high in each block of the plurality of blocks is determined and compared against $T_2$. An output binary image (or feature image) is then formed by representing each block from the binary image with a single binary pixel in the feature image. The single binary pixel in the feature image is set high when the corresponding block in the binary image has a determined concentration which exceeds $T_2$. The single binary pixel in the feature image is set low when the corresponding block in the binary image has a determined concentration which does not exceed $T_2$. Since a single binary pixel is used in a feature image to represent each 8×8 block of pixels in a binary image, a feature image which is 97×161 pixels in dimension will be formed from a binary image which is 782×1288 pixels in dimension.

Figure 3B:
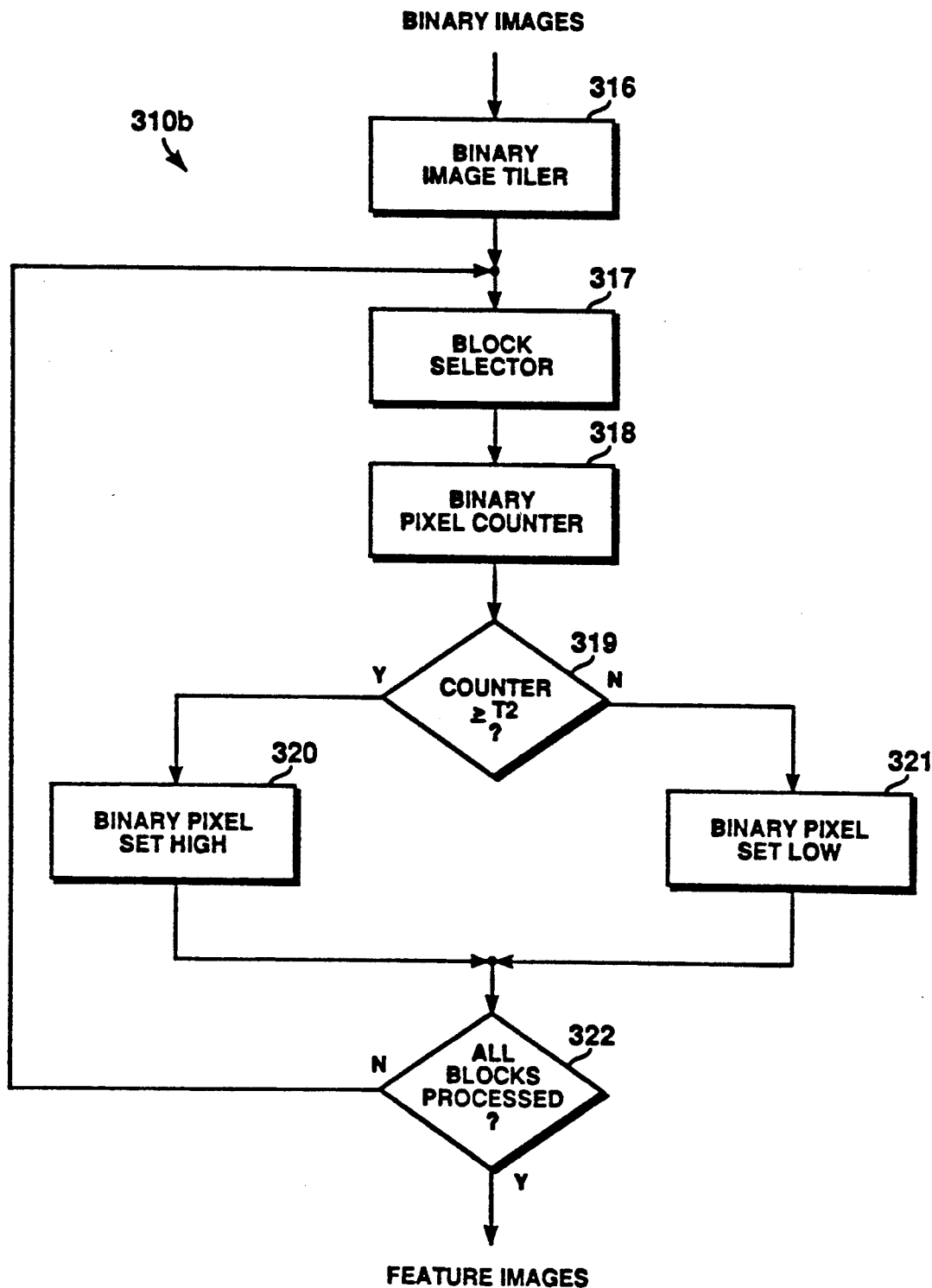
FIG. 3B is a flow diagram illustrating a process for generating feature images from binary images according to a preferred embodiment of the present invention.
Figure 6C:
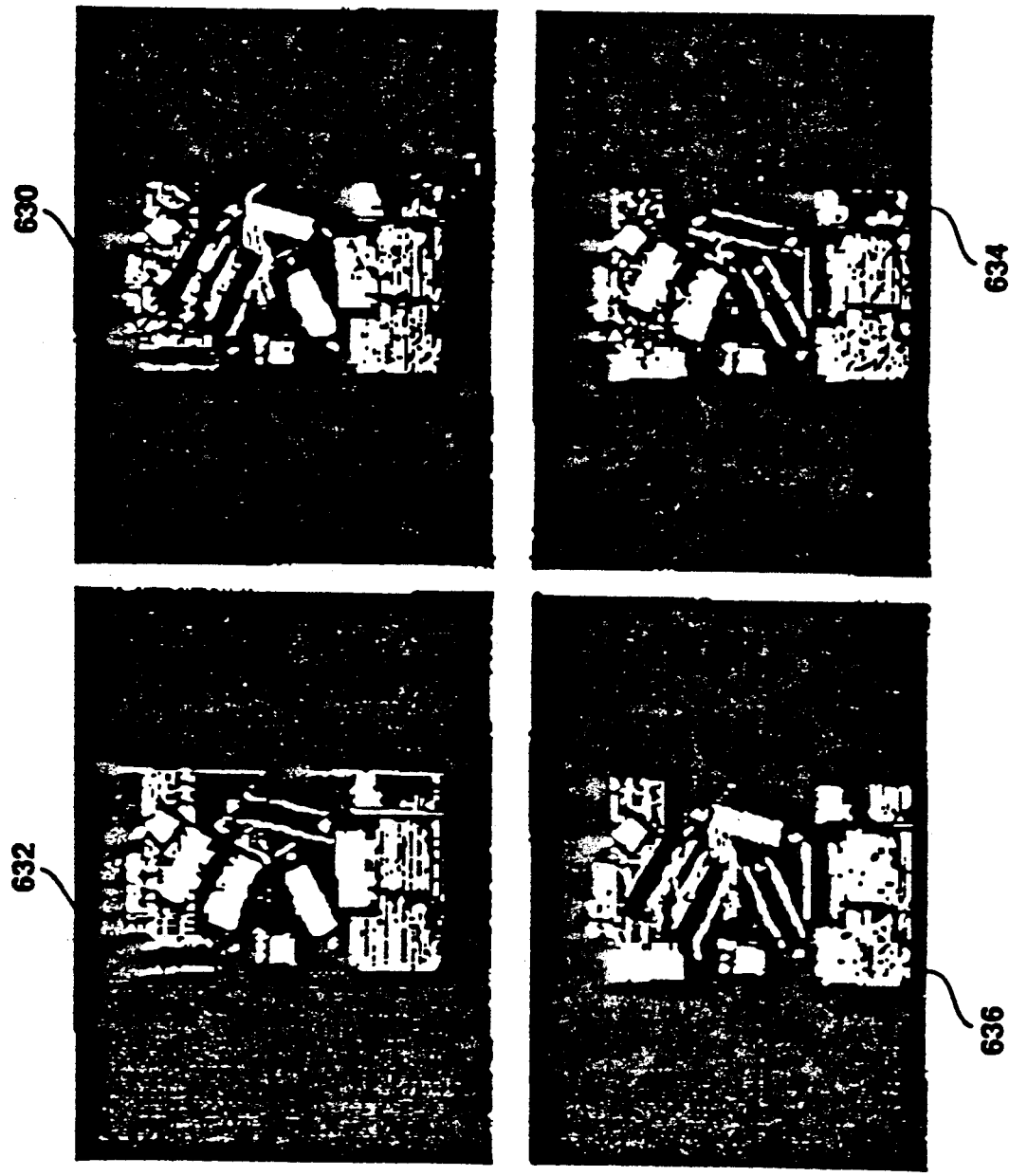
FIG. 6C shows four exemplary feature images which resulted from the application of the majority dilation and minority erosion process of FIG. 3B to the binary images of FIG. 6B.

Referring now to FIG. 3B, there is shown a flow diagram of means 310b for generating at least two feature images from at least two binary images according to the majority erosion/minority erosion process described above. In the embodiment shown, means 316 is provided for tiling each of the binary images into a plurality of blocks. One block from the plurality of tiled blocks is then selected by means 317 and the number of binary pixels set high in the selected block is determined by pixel counter means 318. Comparing means 319 is provided for comparing the number of pixels determined by means 318 to $T_2$. If the number of binary pixels set high in the selected block exceeds $T_2$, then means 320 sets a corresponding binary pixel in a corresponding feature image high (or white). If the number of binary pixels set high in the selected block does not exceed $T_2$, then means 321 sets a corresponding binary pixel in a corresponding feature image low (or black). Means 322 is provided for repeating this process from means 317 for each tiled block. FIG. 6C shows four exemplary feature images 630, 632, 634, 636 which respectively resulted from the application of the majority dilation/minority erosion process of FIG. 3B to binary images 620, 622, 624, 626 of FIG. 6B.

In an alternate preferred embodiment of means 310b, a "sliding" window is applied to each of the at least two binary images. The sliding window is, for example, an 8×8 block of pixels. This window is first applied to the 8×8 block of pixels in the upper left hand corner of a selected binary image. The number of pixels set high in the window is compared against $T_2$. If the number of pixels in the window set high exceeds $T_2$, then a corresponding binary pixel in a corresponding feature image is set high; otherwise, the corresponding binary pixel in the corresponding feature image is set low. The window is then moved one pixel to the right and the process is repeated. This process continues until the right side of the sliding window reaches the right side of the selected binary image. At this point, the window is moved downward by one pixel and over to the left most column of pixels. This process is repeated until the sliding window reaches the bottom right hand corner of the selected binary image.

In a still further preferred embodiment of means 310b, the majority dilation/minority erosion process is achieved by first dividing each of the at least three binary images into a plurality of regions. Next, the concentration of binary pixels set high in each region of the plurality of regions is determined and compared against $T_2$. In each region where the determined concentration exceeds $T_2$, a pixel cluster region is formed by setting all binary pixels in that region high (or white). In each region where the determined concentration does not exceed $T_2$, a blank region is formed by setting all binary pixels in that region low (or black).

Figure 3C:
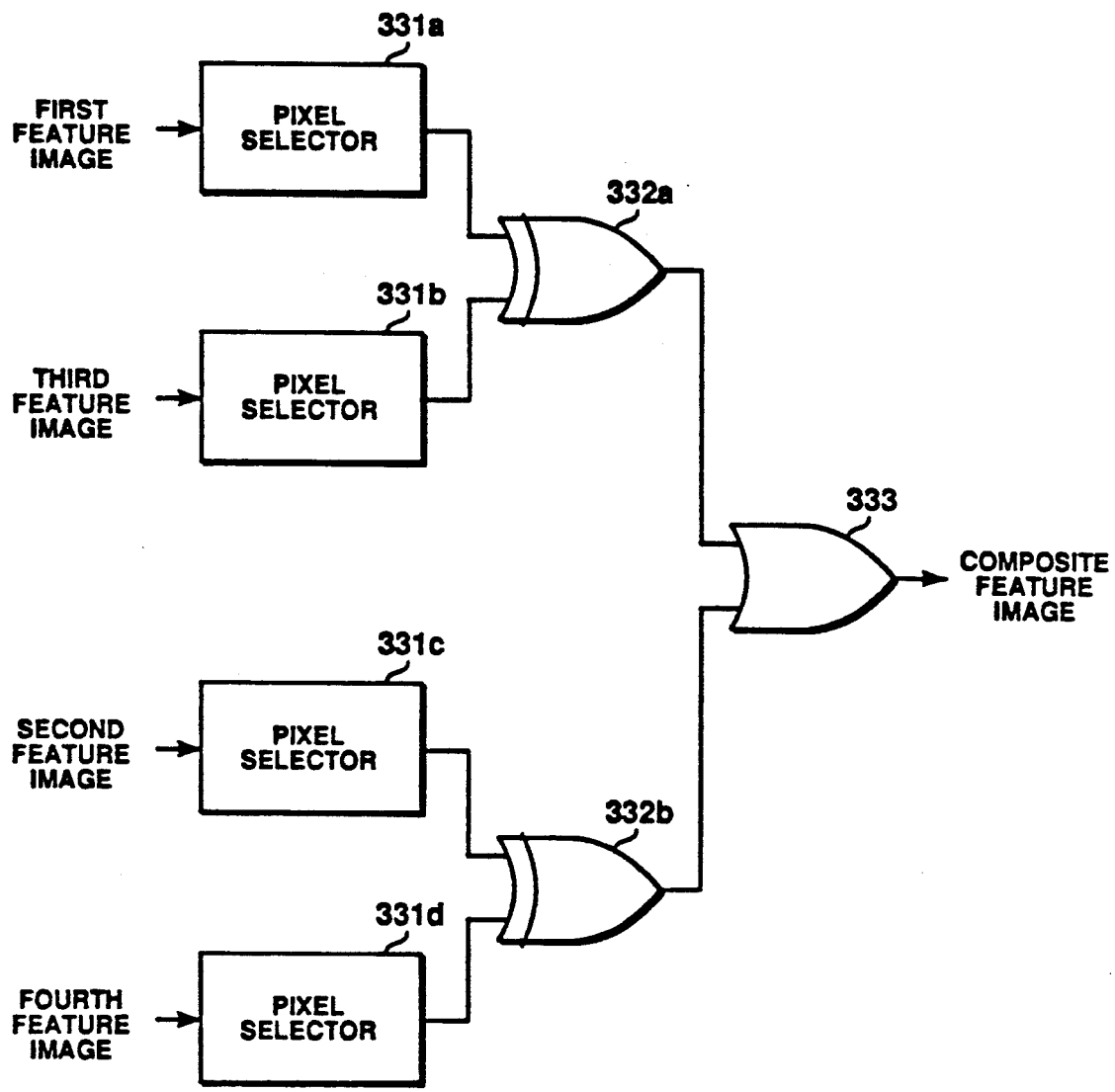
FIG. 3C is a flow diagram illustrating the operation of a composite feature image generator according to a preferred embodiment of the present invention.

The output of feature image generator 310 is provided to composite feature image generator 330. FIG. 3C is a flow diagram illustrating the operation of a preferred composite feature image generator according to the present invention. In a preferred embodiment, first, second, third and fourth feature images are provided to means 330. The first feature image having been determined from a first binary image representing edges orientated in the directional range within 22.5 degrees on either side of the 0 degree axis; the second feature image having been determined from a second binary image representing edges orientated in the directional range within 22.5 degrees on either side of the 45 degree axis; the third feature image having been determined from a third binary image representing edges orientated in the directional range within 22.5 degrees on either side of the 90 degree axis; and the fourth feature image having been determined from a fourth binary image representing edges orientated in the directional range within 22.5 degrees on either side of the 135 degree axis.

Figure 6D:
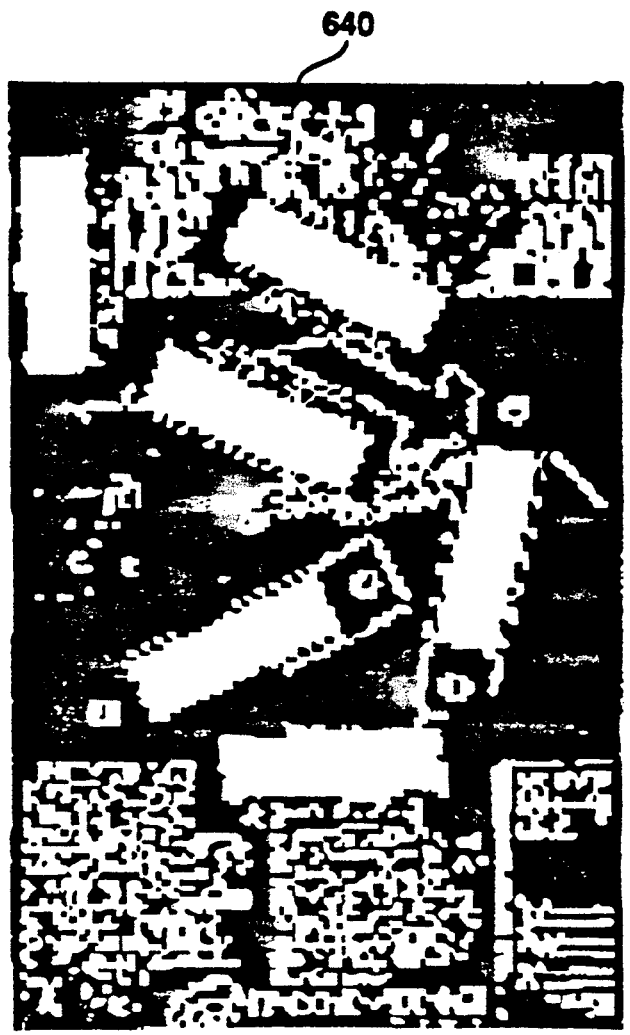
FIG. 6D shows an exemplary composite feature image which resulted from the application of the process of FIG. 3C to the feature images of FIG. 6C.

Referring still to FIG. 3C, pixel selector means 331a, 331b, 331c, 331d are provided for selecting corresponding binary pixels from the first, second, third and fourth feature images. First ORing means 332a is provided for performing an exclusive logical OR operation on a binary pixel in the first feature image and a corresponding binary pixel in the third feature image, and second ORing means 332b is provided for performing an exclusive logical OR operation on a binary pixel in the second feature image and a corresponding binary pixel in the fourth feature image. The outputs of first ORing means 332a and second ORing means 332b are provided to third ORing means 333 where they are compared on a pixel by pixel basis. More particularly, means 333 performs a logical OR operation on its inputs and sets either high or low a corresponding binary pixel in a composite feature image depending on the result of the OR operation. The binary pixel set in the composite feature image corresponds in position to the position within each of the four feature images of the binary pixels selected by means 331a, 331b, 331, 331d. FIG. 6D shows an exemplary composite feature image 640 which resulted from the application of the process of FIG. 3C to feature images 630, 632, 634, 636 of FIG. 6C.

Figure 3D:
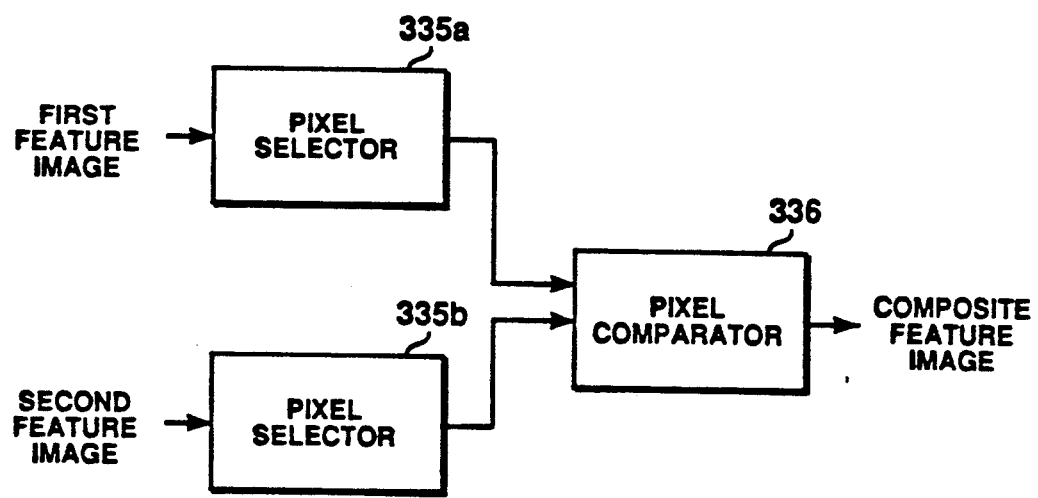
FIG. 3D is a flow diagram illustrating the operation of an alternative composite feature image generator according to a preferred embodiment of the present invention.

Referring now to FIG. 3D, there is shown an alternative composite feature image generator wherein only two feature images are provided to means 330. Pixel selector means 335a, 335b, are provided for selecting corresponding binary pixels from each of first and second feature images. Pixel comparator means 336 is provided for setting high a binary pixel in a composite feature image if only one of the two selected corresponding binary pixels is set high. In a further alternative embodiment (not shown) wherein three feature images are provided to means 330 and three corresponding binary pixels are selected from each of first, second and third feature images, pixel comparator means 336 sets high a binary pixel in a composite feature image if only one or only two of the three selected corresponding binary pixels are set high. The pixel set high in the composite feature image corresponds in position to the position within each of the feature images of the selected corresponding binary pixels. This process is repeated on a pixel by pixel basis for each group of corresponding pixels in the feature images.

Figure 3E:
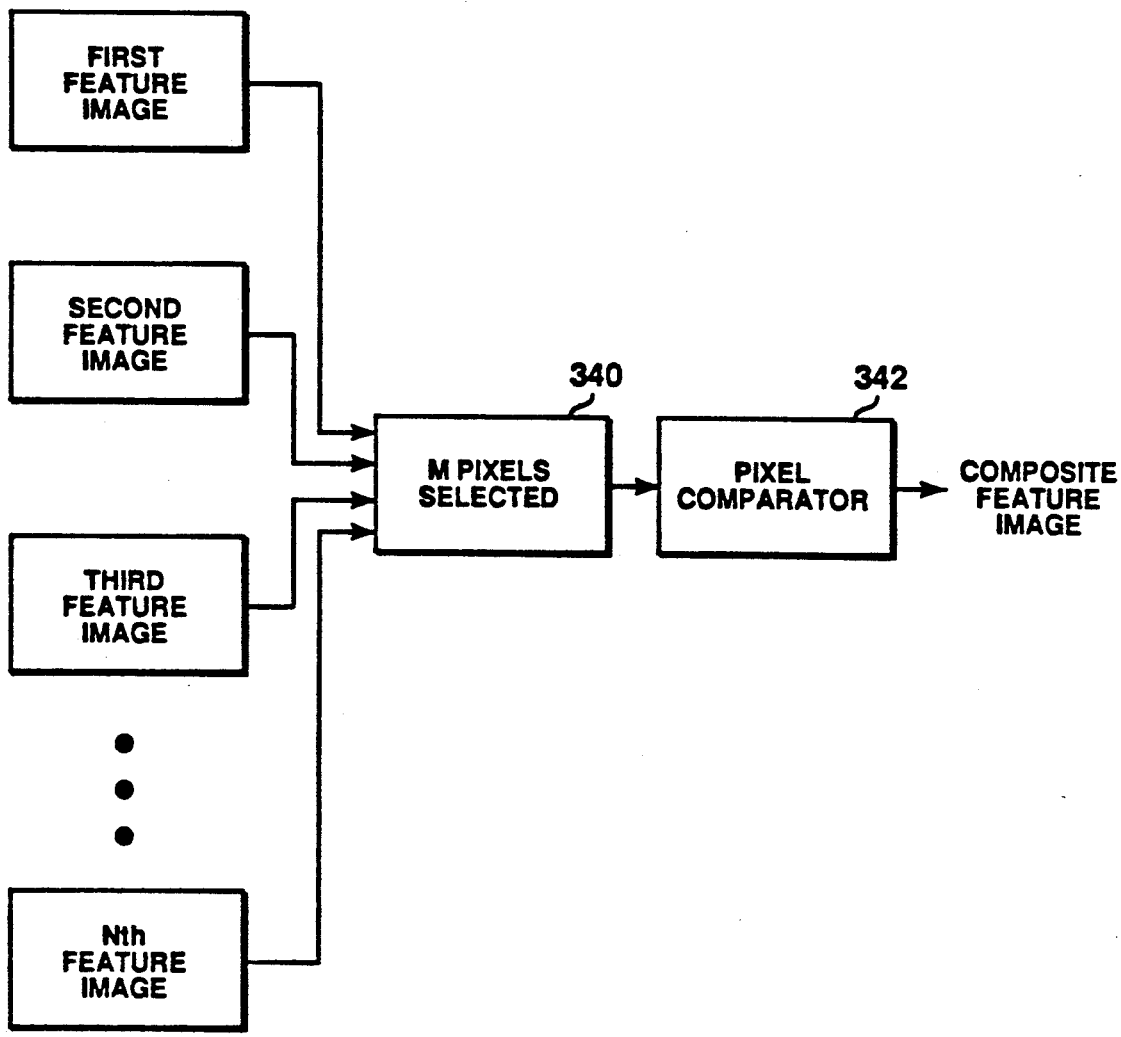
FIG. 3E is a flow diagram illustrating the operation of a still further alternative composite feature image generator according to a preferred embodiment of the present invention.

A still further alternative embodiment of a composite feature image generator according to the present invention is shown in FIG. 3E. In the embodiment shown, N feature images are provided to the composite feature image generator, wherein N is greater than or equal to two. Means 340 are provided for selecting a corresponding pixel from each of M feature images, wherein M is greater than or equal to two and less than or equal to N (for bar code symbols, M is preferably two). At least one of the M selected corresponding binary pixels is preferably from feature images representing edges oriented in subsequent directional ranges. For example, where M is two and there are first, second, third and fourth (N=4) feature images respectively representing detected edged in a first directional range of 22.5 degrees on either side of the 0 degree axis, a second directional range of 22.5 degrees on either side of the 95 degree axis, a third directional range of 22.5 degrees on either side of the 90 degree axis and a fourth directional range on either side of the 135 degree axis, the two selected corresponding binary pixels are preferably from either the first and second, or the second and third, or the third and fourth, or the fourth and first feature images. Means (not shown) are also provided for selecting a pixel from a composite feature image; the selected pixel in the composite feature image corresponds in position to the position within each of the M feature images of the selected corresponding binary pixels. The selected pixel from the composite feature image is then set high by pixel comparator 342 if at least one of the M selected corresponding binary pixels is set high and less than all of the M selected corresponding binary pixels are set high. This process is repeated on a pixel by pixel basis for each pixel in the composite feature image.

Figure 6E:
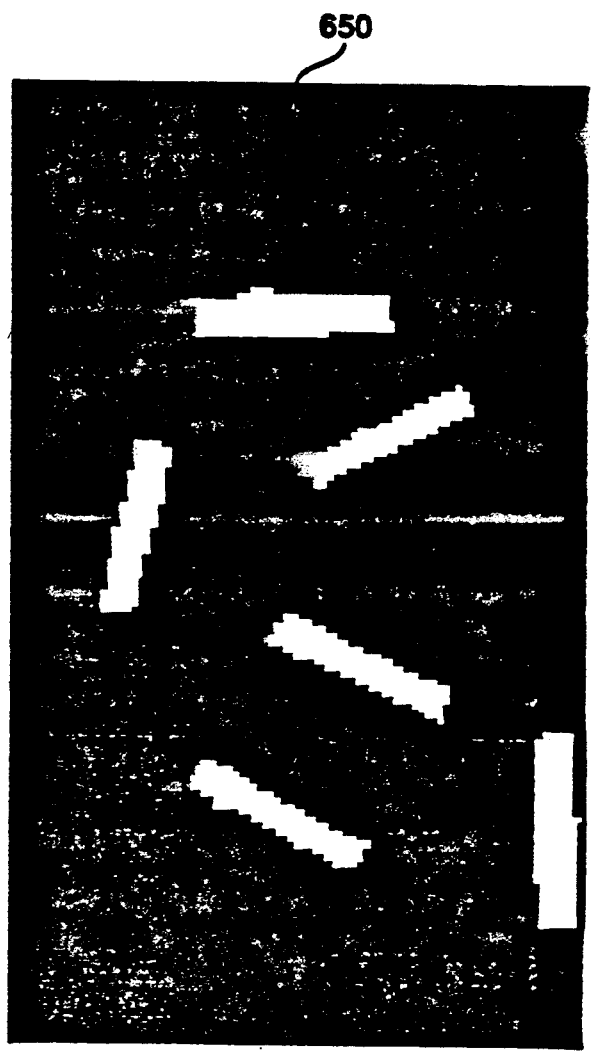
FIG. 6E shows an exemplary composite feature image which resulted from the application of the majority dilation and minority erosion process of FIG. 3E to the composite feature image of FIG. 6D.

The output of composite feature image generator 330 is provided to pixel cluster region generator 350. Pixel cluster region generator 350 filters the composite feature image using a modified version of the majority dilation/minority erosion described above. In particular, pixel cluster region generator 350 is used to "dilate" areas in the composite feature image where the concentration of pixels set high exceeds a third predetermined threshold ($T_3$), and to "erode" areas in the composite feature image where the concentration of binary pixels set high does not exceed $T_3$. In a preferred embodiment of pixel cluster region generator 350, this majority dilation/minority erosion process is achieved by applying a "sliding" window to the input composite feature image. More particularly, in the sliding window operation of pixel cluster region generator 350, a window (preferably 3×3 pixels in dimension) is first applied to the pixels in the upper left hand corner of the input composite feature image. Thus, if a window 3×3 pixels in dimension were employed, it would first be applied to the 3×3 block of pixels in the upper left hand corner of the input composite feature image. The number of pixels set high in the window is compared against $T_3$. If the number of pixels in the window set high exceeds $T_3$, then a corresponding pixel positioned in the center of the 3×3 window will be set high in the output composite feature image; otherwise, the corresponding pixel in the output composite feature image will be set low. The window is then moved one pixel to the right and the process is repeated. This process continues until the right side of the window reaches the right side of the input composite feature image. At this point, the window is moved downward one pixel and over to the left most column of pixels in the input composite feature image. This process is repeated until the sliding window reaches the bottom righthand corner of the input composite feature image. FIG. 6E shows an exemplary output composite feature image (650) which resulted from the application of the majority dilation/minority erosion process described above to composite feature image 640 of FIG. 6D.

In an alternative preferred embodiment of pixel cluster region generator 350, the majority dilation/minority erosion process is achieved by first dividing the composite feature image into a plurality of regions. Next, the concentration of binary pixels set high in each region of the plurality of regions is determined and compared against $T_3$. In each region where the determined concentration exceeds $T_3$, a pixel cluster region is formed by setting all binary pixels in that region high (or white). In each region where the determined concentration does not exceed $T_3$, a blank region is formed by setting all binary pixels in that region low (or black).

Figure 3F:
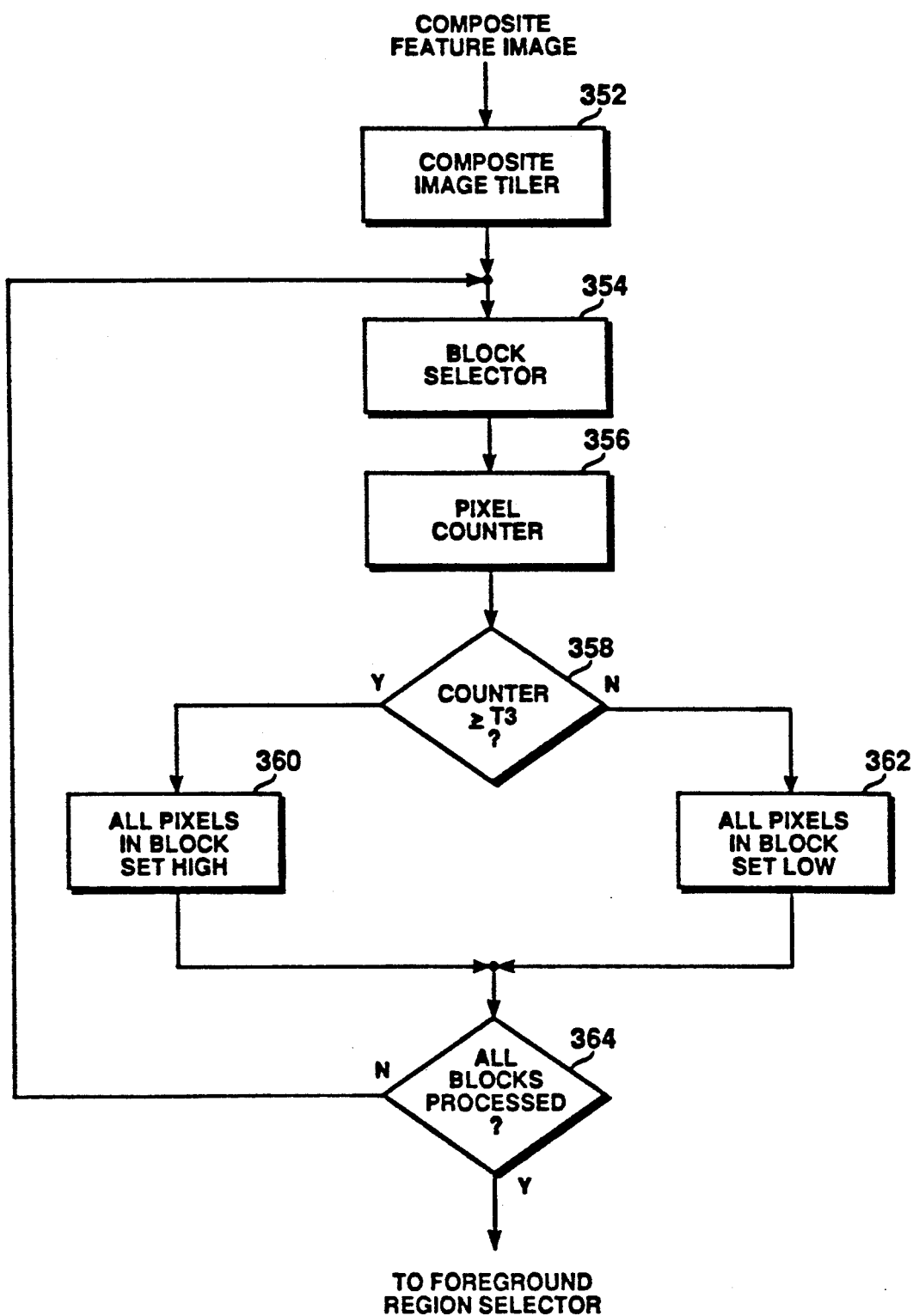
FIG. 3F is a flow diagram illustrating the operation of a pixel cluster region generator for processing a composite feature image according to a preferred embodiment of the present invention.

Referring now to FIG. 3F, there is shown a flow diagram of a pixel cluster region generator for processing a composite feature image according to the majority dilation/minority erosion process described in the paragraph immediately above. Means 352 is provided for tiling each of the composite feature image into a plurality of blocks. One block from the plurality of tiled blocks is then selected by means 354 and the number of binary pixels set high in the selected block is determined by pixel counter means 356. Comparing means 358 is provided for comparing the number of pixels determined by means 356 to $T_3$. If the number of binary pixels set high in the selected block exceeds $T_3$, then means 360 sets all binary pixels in the selected block high. If the number of binary pixels set high in the selected block does not exceed $T_3$, then means 362 sets all binary pixels in the selected block low. Means 364 is provided for repeating this process from means 354 for each tiled block.

The output of edge information comparator 300 is provided to means 400 for selecting at least one foreground region from intensity image 100. Means 400 selects at least one foreground region wherein detected edges are angularly oriented substantially in accordance with a target orientation. In a first preferred embodiment, a foreground region selected by means 400 will typically correspond in location to the position of a bar code symbol or a stacked bar code symbol in intensity image 100. In this first embodiment, foreground region selector 400 preferably selects a foreground region with detected edges having a target orientation wherein (i) substantially all the detected edges are angularly oriented in only one or only two of four directional ranges, (ii) substantially all the detected edges are angularly oriented in only one of at least two directional ranges, or (iii) detected edges angularly oriented within at least one and less than all of at least two directional ranges are substantially present. The composite feature image generators shown in FIGS. 3C, 3D, 3E are respectively directed to the formation of composite feature images which facilitate the selection by means 400 of foreground regions in accordance with the above three target orientations.

In a second preferred embodiment, a foreground region selected by means 400 will typically correspond in location to the position of a symbol comprised of a matrix of squares. In this second embodiment, foreground region selector 400 selects at least one foreground region from an intensity image wherein a substantial percentage of detected edges in the foreground region are orthogonal with respect to each other. By selecting foreground regions in accordance with a target orientation of orthogonal edges, foreground region selector 400 may locate within an intensity image symbols coded in accordance with the Vericode TM or Datacode TM symbologies. Details of the Vericode TM and Datacode TM symbologies are disclosed in U.S. Pat. Nos. 4,924,078 and 4,939,154 which are hereby incorporated herein in their entirety by reference. A composite feature image useful for selecting foreground regions having orthogonal edges may be formed by comparing feature images corresponding to directional ranges oriented 90 degrees apart.

In a third preferred embodiment, a foreground region selected by means 400 will typically correspond in location to the position of a symbol comprised of a matrix of hexagons. In this third embodiment, foreground region selector 400 selects at least one foreground region from an intensity image wherein a substantial percentage of detected edges in the foreground region are oriented at 60 degrees with respect to each other. By selecting foreground regions in accordance with a target orientation of edges oriented at 60 degrees with respect to each other, foreground region selector 400 may locate within an intensity image symbols coded in accordance with the UPSCode TM symbology. Details of the UPScode TM symbology are disclosed in U.S. Pat. Nos. 4,998,010, 4,896,029 and 4,874,936 which are hereby incorporated herein in their entirety by reference. A composite feature image useful for selecting foreground regions having edges oriented at 60 degrees with respect to each other may be formed by comparing feature images corresponding to directional ranges oriented 60 degrees apart.

Figure 7:
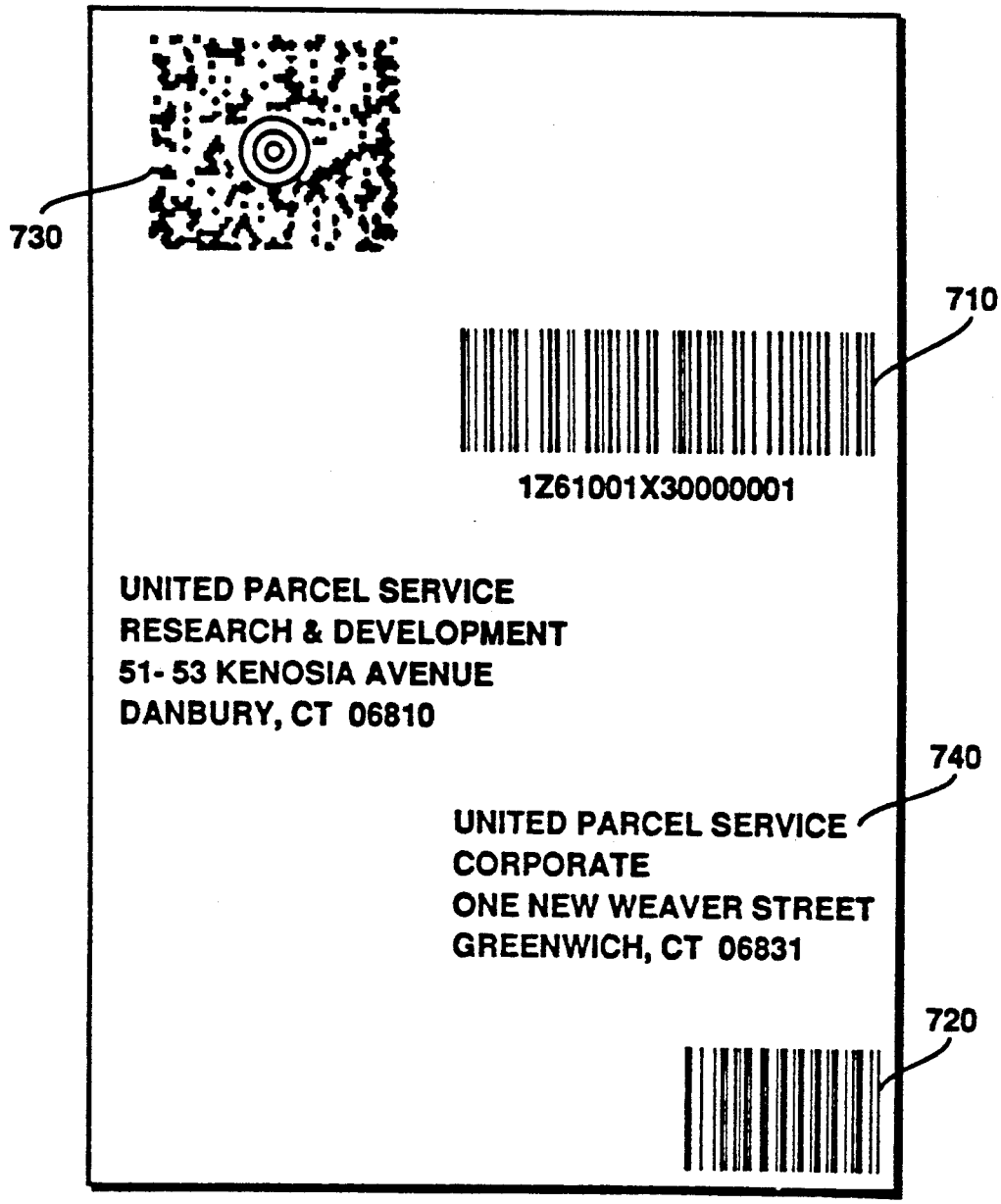
FIG. 7 shows an exemplary packaging label having a plurality of symbols with edges oriented in accordance with different target orientations.

In an alternate preferred embodiment of the object locator system of the present invention, means 400 for selecting at least one foreground region is comprised of (i) first means for selecting at least one foreground region in the intensity image wherein detected edges are angularly oriented substantially in accordance with a first target orientation, and (ii) second means for selecting at least one foreground region in the intensity image wherein detected edges are angularly oriented substantially in accordance with a second target orientation. This embodiment may be employed to process a packaging label encoded with two different types of symbologies. An exemplary packaging label encoded with both one-dimensional bar code symbols (710) and (720) and a two-dimensional code symbol (730) formed from an array of hexagons is shown in FIG. 7. Other one-dimensional symbols including stacked bar code symbols, and other two-dimensional symbols including square arrays and arrays of other polygonal shapes, may be positioned on the same label and then located in accordance with the present invention.

Figure 4A:
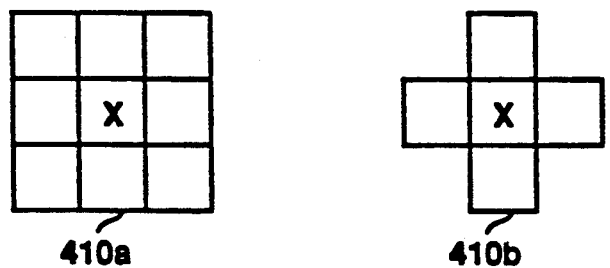
FIG. 4A shows two connectivity operators employed in connection with alternative preferred embodiments of the present invention.
Figure 4:
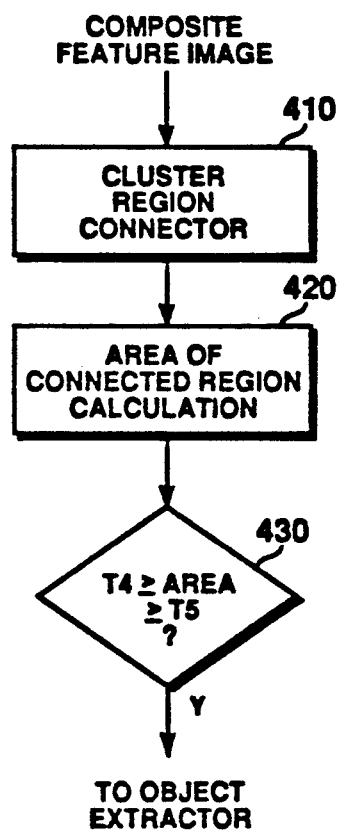
FIG. 4 is a flow diagram illustrating the operation of a foreground region selector according to a preferred embodiment of the present invention.
Figure 5:
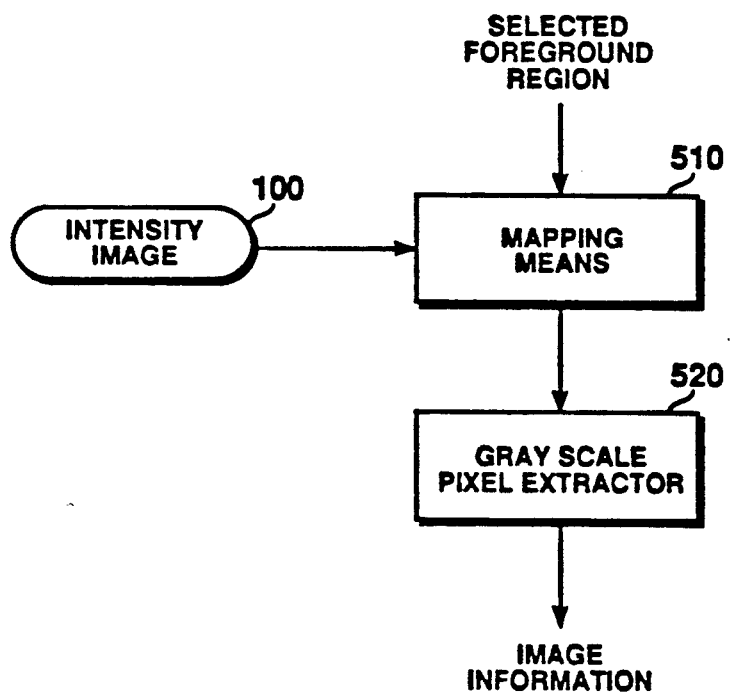
FIG. 5 is a flow diagram illustrating the operation of an object extracting process according to a preferred embodiment of the present invention.

In the preferred embodiment of the present invention, foreground region selector 400 is provided with means for processing the composite feature image prior to selecting at least one foreground region. This preferred processing step is shown in FIG. 4 and employs means 410 for connecting at least two neighboring pixels in the composite feature image to form at least one connected region. Means 410 connects neighboring pixels by applying either an eight neighbor connectivity operator (410a) or a four neighbor connectivity operator (410b) throughout the composite feature image. Means 420 for calculating the area of each connected region and means 430 for comparing each calculated area to a fourth predetermined threshold ($T_4$) and a fifth predetermined threshold ($T_5$) are also provided. Means 430 filters out of the composite feature image each connected region with an area below $T_4$ or above $T_5$. At least one foreground region is then selected by means 400 from the remaining unfiltered connected regions. In the first preferred embodiment discussed above for selecting bar code or stacked bar code symbols, the comparison against $T_4$ and $T_5$ is used to eliminate from the selection process those potential foreground regions which are either too small or too large to comprise a bar code or stacked bar code symbol.

In the preferred embodiment of the present invention, output from foreground selection means 400 is provided to means 500 for extracting image information representative of at least one object from intensity image 100. Means 500 includes means 510 for mapping at least one selected foreground region onto intensity image 100 to form at least on object region in intensity image 100, and means 520 for extracting gray scale pixels representative of said at least one object region.

Figure 8:
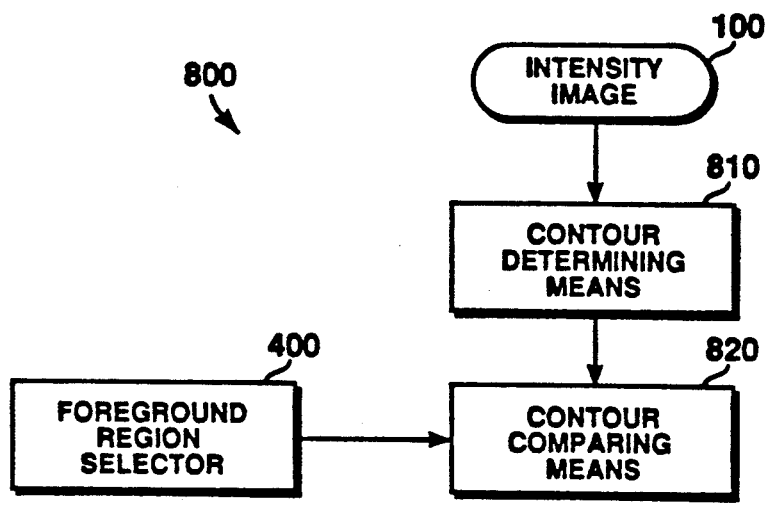
FIG. 8 is a flow diagram illustrating the operation of a pre-processing step employed in connection with a preferred embodiment of the present invention.
Figure 8A:
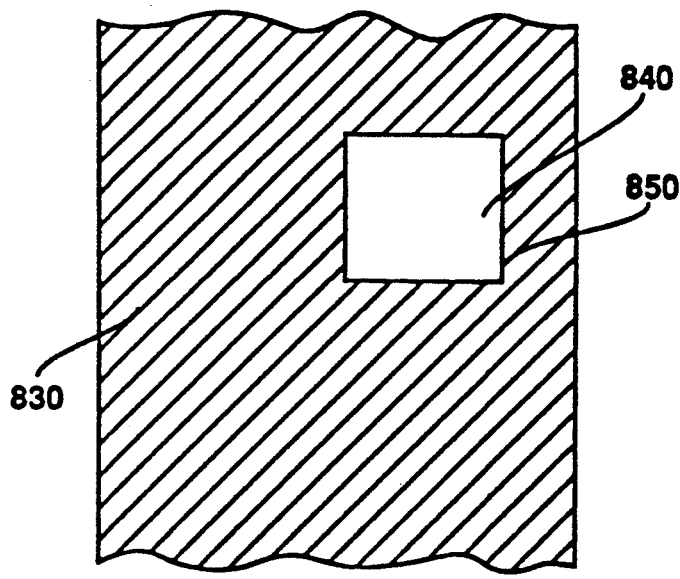
FIG. 8A shows the contour of an exemplary package positioned on a black belt.

The object locator system of the present invention may be employed to locate bar code symbols and other types of symbols affixed to packages positioned on a moving belt. In FIG. 8, there is shown means 800 for associating each foreground region selected by means 400 with a particular package. Means 800 performs a preferred pre-processing step which allows the present invention to tie together (or associate) a plurality of symbols (for example symbols 710, 720, 730) which are affixed to the same package. Means 800 includes means 810 for determining the contour or outline of each package on a belt. As shown in FIG. 8A, belt 830 (which is preferably colored black) appears as a large contiguous dark region when scanned; a package 840, however, appears as a contiguous bright region when scanned. Means 810 preferably determines contour 850 of package 840 by application of either a contour tracing algorithm or a connectivity operator to intensity image 100. Means 820 is provided for comparing a contour with a foreground region selected by means 400. Means 830 then associates a foreground region selected by means 400 with a package if that foreground region is positioned within the contour corresponding to that package.

The present invention may be implemented on a Datacube ™ Maxvideo ™ system. When edge magnitude information normalized to range from 0–127 has been determined for each pixel in an exemplary intensity image formed of 782×1288 8-bit pixels, suitable values of $T_1$, $T_4$ and $T_5$ are 24, 128 and 2048 respectively. When these parameters are used and the blocks tiled by means 316 are 8×8 pixels in dimension and the sliding window used by pixel cluster region generator 350 is 3×3 pixels in dimension, suitable values of $T_2$ and $T_3$ are 24 and 6 respectively.

Object Positioning And Orientation System

Figure 9:
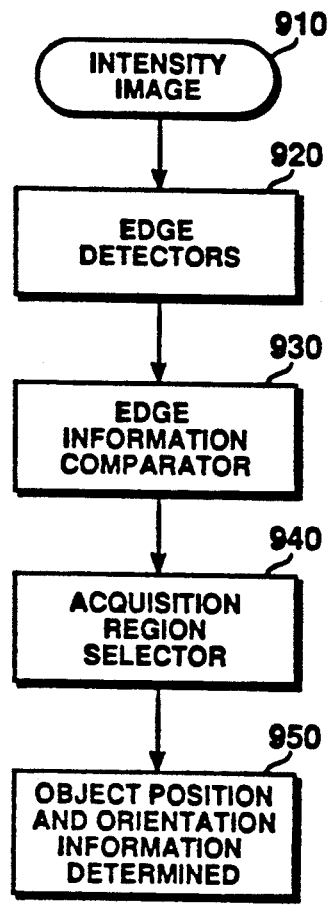
FIG. 9 is flow diagram illustrating the operation of a preferred embodiment of determining the orientation of an object in an intensity image according to the present invention.

Referring now to FIG. 9, there is shown a flow diagram illustrating the operation of a preferred embodiment of a system for determining the orientation of an object within an intensity image according to the present invention. The system accepts as its input intensity image 910 which is preferably a digitized gray scale representation of an imaged region being scanned. In the preferred embodiment, intensity image 910 is a low resolution image derived from a linear array of CCDs. The system shown includes means 920 for analyzing intensity image 910 with at least two different edge detectors to detect a multiplicity of edges oriented in at least two directional ranges. Means 920 functions substantially the same as means 200 described above. Means 930 is provided for comparing information representative of detected edges angularly oriented in a first of said at least two directional ranges and information representative of detected edges angularly oriented in a second of said at least two directional ranges. Means 930 functions substantially the same as means 300 described above. Based on the results of comparisons made by means 930, means 940 selects an acquisition region from intensity image 910 wherein detected edges are angularly oriented substantially in accordance with a target orientation. Means 950 then determines the position and orientation of at least one object in intensity image 910 in accordance with the selected acquisition region.

The output of means 930 is provided to means 940 for selecting an acquisition from intensity image 910. Means 940 selects an acquisition region wherein detected edges are angularly oriented substantially in accordance with a target orientation. Means 940 functions substantially the same as means 400 described above, except means 940 selects an acquisition region as opposed to a foreground region. Thus, the acquisition region selected by means 940 may correspond in location to (i) the position of a bar code symbol or a stacked bar code symbol in intensity image 910, (ii) the position of a symbol comprised of a matrix of squares in intensity image 910, or (iii) the position of a symbol comprised of a matrix of hexagons or other polygons in intensity image 910.

Means 950 determines the orientation of at least one object in intensity image 910 in accordance with the acquisition region selected by means 940. In a preferred embodiment, the acquisition region selected by means 940 has a known spatial relationship to at least one object in intensity image 910. For example, in the label of FIG. 7, symbols 710, 720, 730 will preferably have a predetermined spatial relationship which is known to means 950. Thus, if an acquisition region representative of symbol 730 is selected, means 950 can determine the position of symbols 710, 720 by application of a known spatial relationship to the selected acquisition region. Alternatively, a bar code symbol (such as 710) may be used by means 950 to find (or acquire) either another bar code symbol (such as 720) or a two-dimensional symbol (such as 730) or a text block (such as 740) within intensity image 910.

Image Processing System

Figure 10:
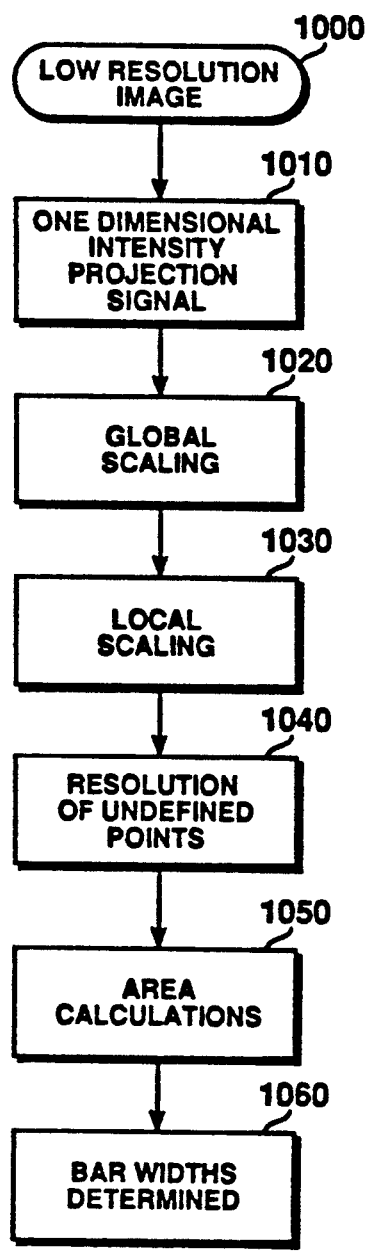
FIG. 10 is a flow diagram illustrating the operation of a preferred system for determining bar widths from a two-dimensional image representative of a bar code symbol according to the present invention.

Referring now to FIG. 10, there is shown a flow diagram illustrating the operation of a preferred system for determining bar widths from a two-dimensional image 1000 representative of a bar code symbol. In a preferred embodiment, image 1000 is a low resolution image formed of gray scale pixels which have been extracted from intensity image 100 by means 520. The system shown includes means 1010 for forming a one-dimensional intensity projection signal from two-dimensional image 1000, means 1020 for globally scaling the projection signal, means 1030 for locally scaling the projection signal, means 1040 for resolving undefined points in the projection signal, means 1050 for calculating the areas of a plurality of regions described by the projection signal and means 1060 for determining a plurality of bar widths from the areas calculated by means 1050.

Figure 11:
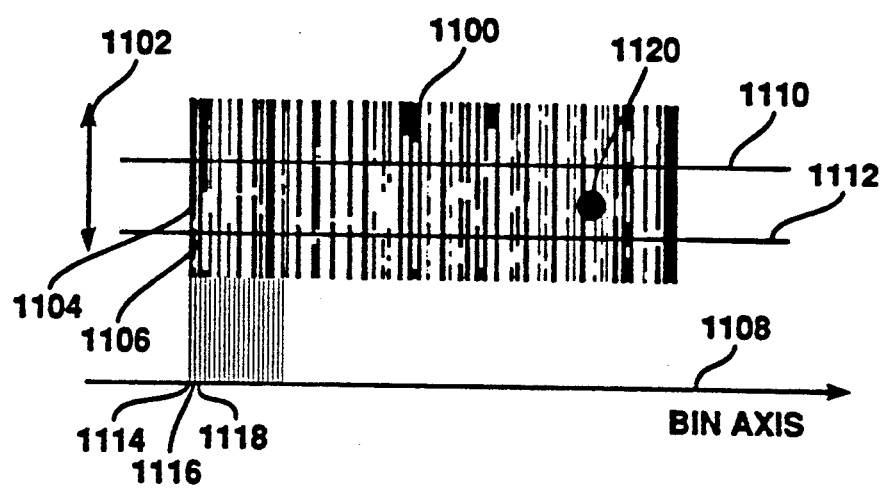
FIG. 11 shows an exemplary low resolution image for processing by the image processing system of the present invention.

FIG. 11 shows a exemplary low resolution image 1100 to be processed according to the image processing system of the present invention. Low resolution image 1100 is representative of a bar code symbol having bars oriented parallel to the bar direction shown by arrow 1102. Bar direction 1102 is determined either from (i) finder points (not shown) in the quiet zone of the bar code symbol, (ii) through the application of equation (2) above to the edges of image 1100 of (iii) by computing the major axis of image 1100. According to the present invention, image 1000 is divided into a plurality of two-dimensional sections (or bins) 1104, 1106. Bins 1104, 1106 are oriented parallel to bin axis 1108 and perpendicular to bar direction 1102. Thus, bin 1104 is bounded on its top and bottom by reference lines 1110, 1112 and on its left and right by reference lines 1114, 1116. Similarly, bin 1106 is bounded on its top and bottom by reference lines 1110, 1112 and on its left and right by reference lines 1116, 1118.

Figure 12A:
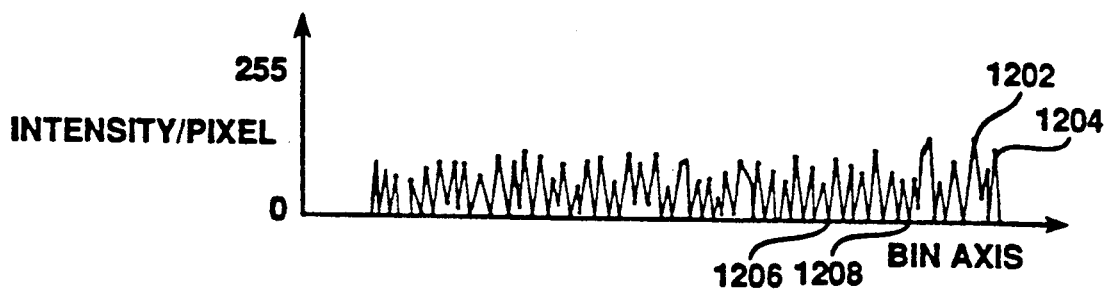
FIG. 12A shows a one-dimensional intensity projection image derived from a low resolution image representative of a bar code symbol according to the present invention.

The present invention then determines information representative of the intensity of the pixels in each bin 1104, 1106. This intensity information determination is preferably made for a given bin by calculating the average intensity of all pixels in that bin. Means 1010 then forms a one-dimensional projection signal by plotting this intensity information for each bin 1104, 1106 along the bin axis. FIG. 12A shows an exemplary one-dimensional projection signal derived from a low resolution image representative of a bar code symbol in accordance with the method described above. By originally calculating each point in the projection signal from a two-dimension section (or bin), it was found that the present image processing system could be used to recover bar widths even from a corrupted bar code symbol which included a defect such as 1120.

The output of means 1010 is provided to means 1020 for performing a first global scaling operation on a projection signal in accordance with a minimum global scaling parameter and a maximum global scaling parameter. Means 1020 includes means for determining a plurality of local maximum values (1202, 1204) from the projection signal, and means for determining a plurality of local minimum values (1206, 1208) from the projection signal. In the preferred embodiment, a local maximum value is determined at each peak in the projection signal, and a local minimum value is determined at the bottom of each valley in the projection signal. Means 1020 determines a maximum global scaling parameter ($P_{max}$) by averaging the local maximum values determined above, and a minimum global scaling parameter ($P_{min}$) by averaging the local minimum values determined above.

Means 1020 globally scales the projection signal by "stretching" the projection signal so that it extends along its entire dynamic range. In a preferred embodiment of the first global scaling method, all values of the projection signal exceeding $P_{max}$ are first rectified to $P_{max}$, and all values of the projection signal below $P_{min}$ are rectified to $P_{min}$. Means then 1020 globally scales each pixel (P) in the rectified projection signal according to equation (3) below:

$$P_{GS} = P * (dynamic\ range)/(P_{max} - P_{min}) \quad (3)$$

Figure 12B:
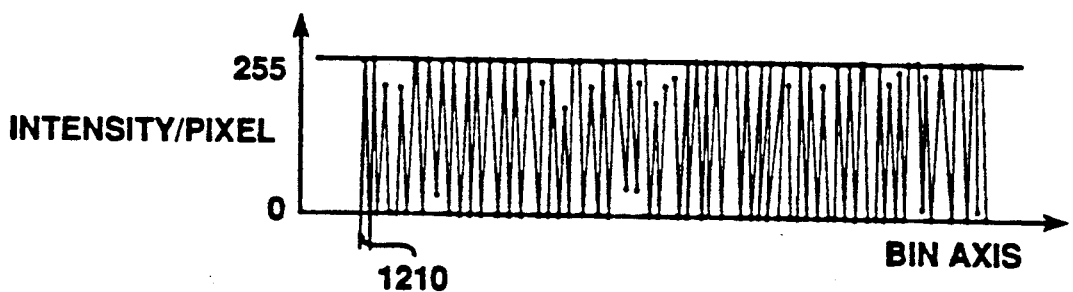
FIG. 12B shows an exemplary projection signal derived from the application of the first global scaling method of the present invention to the projection signal of FIG. 12A.

The exemplary projection signal of FIG. 12A was determined from an image formed of 8-bit pixels having a dynamic range from 0 to 255. FIG. 12B shows an exemplary projection signal derived from the application of the first global scaling method described above to the projection signal of FIG. 12A.

The output of means 1020 is provided to means 1030 for locally scaling a projection signal in accordance with the local maximum and minimum values determined above. Means 1030 includes means for positioning a sliding window (1210) on pixels from the globally scaled projection signal, means for calculating a contrast value for pixels in the window, means for locally scaling pixels in the window and means for marking pixels in the window as undefined. As shown in equation (4) below, means 1030 calculates a contrast value ($C_{win}$) for pixels in the sliding window by subtracting the maximum value ($Max_{win}$) in the window from the minimum value in the window ($Min_{win}$) and dividing this amount by the maximum of the dynamic range:

$$C_{win} = (Max_{win} - Min_{win})/(dynamic\ range) \quad (4)$$

Means 1030 then compares $C_{win}$ against a sixth predetermined threshold ($T_6$). If $C_{win}$ is greater than $T_6$, then means 1030 locally scales the pixels in the window; otherwise, means 1030 marks the pixels in the window as undefined. In a preferred embodiment, after the pixels in window 1210 are processed as above, the window is moved to the right by one bin and the process is repeated. The process continues for the full length of the projection signal.

Means 1030 locally scales the pixels in a window by "stretching" the pixels in the window so that they extend along the entire dynamic range. In a preferred embodiment, means 1030 locally scales each pixel (P) in a window according to equation (5) below:

$$P_{LS} = P * (dynamic\ range)/(Max_{win} - Min_{win}) \quad (5)$$

Figure 12C:
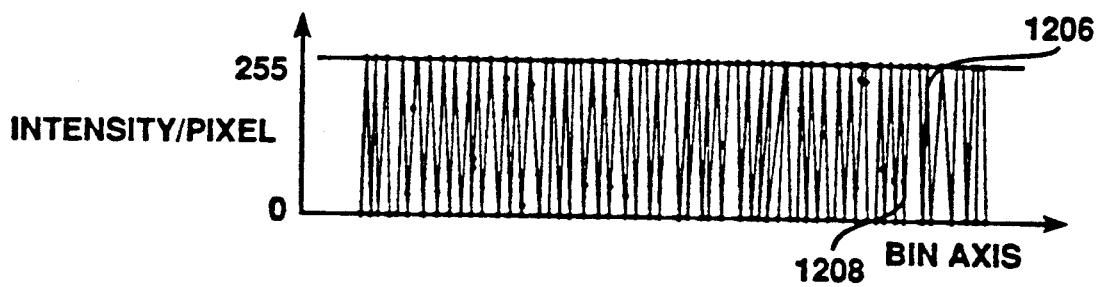
FIG. 12C shows an exemplary projection signal derived from the application of the local scaling and interpolation methods of the present invention to the projection signal of FIG. 12B.
Figure 12D:
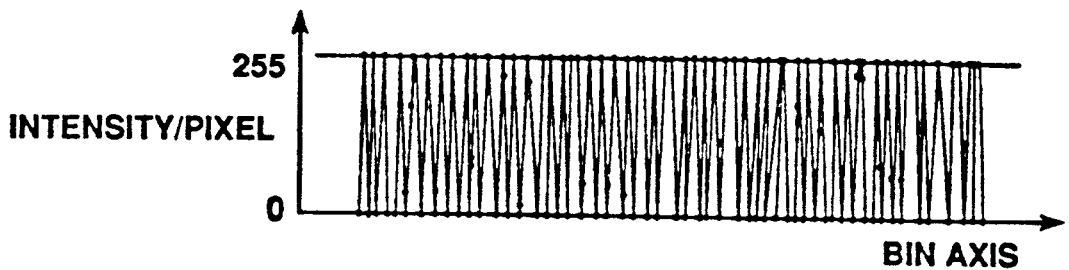
FIG. 12D shows an exemplary projection signal derived from the application of the second global scaling method of the present invention to the projection signal of FIG. 12C.

The output of means 1030 is provided to means 1040 for resolving any pixels marked undefined by means 1030. In a preferred embodiment, means 1040 resolves a pixel marked undefined by linearly interpolating between the closest defined pixels on either side of the undefined pixel. FIG. 12C shows an exemplary projection signal derived from the application of the local scaling and interpolation methods described above to the projection signal of FIG. 12B. In determining the projection signal of FIG. 12C, a window (or bin) width of approximately 5 pixels was employed and $T_6$ was set to approximately 15% of the full dynamic range. In the preferred embodiment, means 1040 also performs a second global scaling operation following the linear interpolation step described above. In this second global scaling operation, any peaks (1206) or valleys (1208) not spanning the full dynamic range are stretched to the limits of the dynamic range. FIG. 12D shows an exemplary projection signal derived from the application of this second global scaling method to the projection signal of FIG. 12C.

Figure 12E:
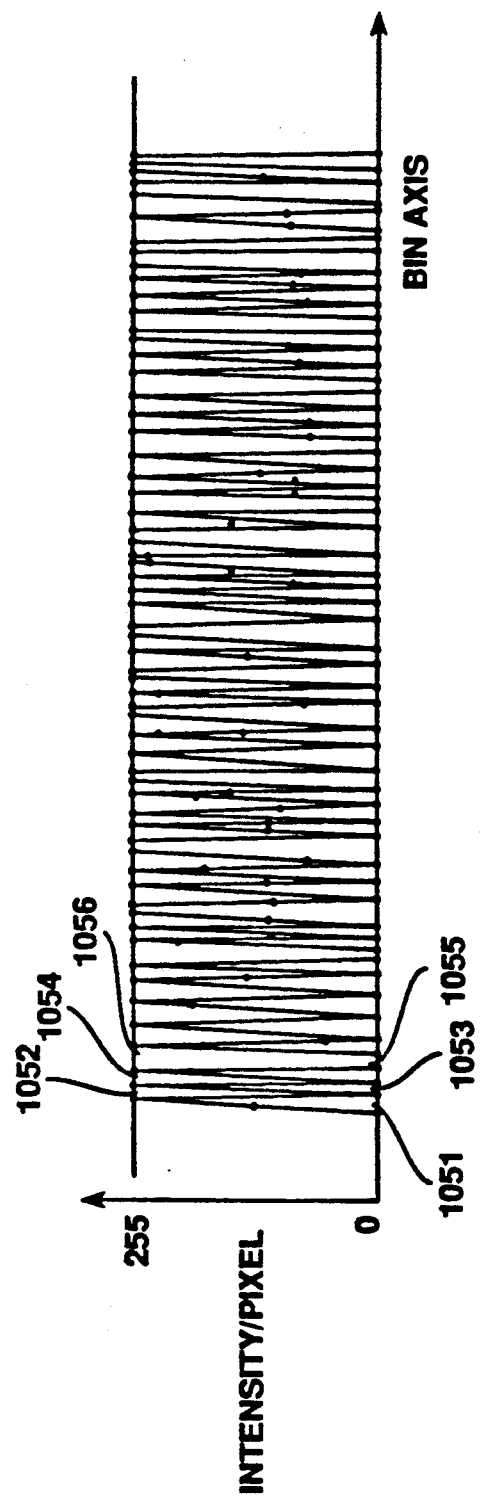
FIG. 12E is an expanded representation of the projection signal of FIG. 12D.

The output of means 1040 is provided to means 1050 for calculating the areas of a plurality of regions described by the projection signal. Referring now to FIG. 12E, there is shown an expanded view of the projection signal of FIG. 12D. Means 1050 calculates a value representative of each area 1051, 1052, 1053, 1054, 1055, 1056 bounded by the projection signal. In the projection signal shown in FIG. 12E, every area is alternatively representative of either a black or a white bar. Thus, areas 1051, 1053, 1055 are representative of black bars, and areas 1052, 1054, 1056 are representative of white bars. The widths of the bars in the bar code symbol being processed are determined from the calculated areas.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for decoding a bar code symbol oriented in a bar direction from a two dimensional digital input image representative of said bar code symbol, said two dimensional input image being comprised of gray scale pixel values received from a CCD sensor, said bar code symbol being comprised of a plurality of modules each of which has at least one bar and at least one space, wherein information is encoded in each of said modules in accordance with its width, comprising the steps of:

(A) dividing said two dimensional input image into a plurality of non-overlapping two dimensional sections, each of said two dimensional sections being bounded by first and second reference lines substantially parallel to said bar direction and third and fourth reference lines substantially perpendicular to said bar direction, wherein said third and fourth reference lines are spaced at least two pixels apart, and wherein said first, second, third and fourth reference lines are oriented omnidirectionally with respect to the rows and columns of pixels in said input image;

(B) determining a plurality of intensity information values representative of the intensities of corresponding sections of said plurality of sections by summing pixel values derived from said input image lying in each of said sections;

(C) forming a one dimensional intensity projection signal by arranging said plurality of intensity information values along an axis, said one dimensional intensity projection signal having a plurality of corresponding peaks;

(D) calculating the areas of a plurality of regions described by said one dimensional intensity projection signal, wherein each of said areas is bounded by a portion of said one dimensional intensity projection signal and said axis, said portion lying between corresponding peaks of said one dimensional projection signal; and (E) determining the widths of a plurality of bars in said bar code symbol from said areas.

2. The method of claim 1, wherein step (C) further comprises the steps of:
   (1) determining from said projection signal a minimum global scaling parameter and a maximum global scaling parameter; and
   (2) globally scaling said projection signal in accordance with said minimum and maximum global scaling values.

3. The method of claim 2, wherein step (C)(1) comprises the steps of:
   (a) determining a plurality of local minimum values from said projection signal;
   (b) determining said minimum global scaling parameter from an average of said plurality of local minimum values;
   (c) determining a plurality of local maximum values from said projection signal; and
   (d) determining said maximum global scaling parameter from an average of said plurality of local maximum values.

4. The method of claim 3, wherein step (C) further comprises the step of:
   (3) locally scaling said projection signal in accordance with said local minimum and local maximum values.

5. The method of claim 4, wherein step (C)(3) comprises the steps of:
   (a) positioning a sliding window on said projection signal;
   (b) calculating a contrast value for pixels in said window;
   (c) comparing said contrast value to a predetermined threshold;
   (d) if said contrast value exceeds said predetermined threshold then
       locally scaling pixels in said window
       otherwise marking pixels in said window as undefined;
   (e) moving said sliding window a distance equal to one bin to the right;
   (f) repeating steps (a)-(e) for the full length of said projection signal; and
   (g) resolving by linear interpolation pixels marked undefined.

6. The method of claim 1, wherein said two dimensional digital image is representative of a corrupted bar code symbol.

7. An apparatus for decoding a bar code symbol oriented in a bar direction from a two dimensional digital input image representative of said bar code symbol, said two dimensional input image being comprised of gray scale pixel values received from a CCD sensor, said bar code symbol being comprised of a plurality of modules each of which has at least one bar and at least one space, wherein information is encoded in each of said modules in accordance with its width, comprising the steps of:

(A) means for dividing said two dimensional input image into a plurality of non-overlapping two dimensional sections, each of said two dimensional sections being bounded by first and second reference lines substantially parallel to said bar direction and third and fourth reference lines substantially perpendicular to said bar direction, wherein said third and fourth reference lines are spaced at least two pixels apart, and wherein said first, second, third and fourth reference lines are oriented omnidirectionally with respect to the rows and columns of pixels in said input image;

(B) means for determining a plurality of intensity information values representative of the intensities of corresponding sections of said plurality of sections by summing pixel values derived from said input image lying in each of said sections;

(C) means for forming a one dimensional intensity projection signal by arranging said plurality of intensity information values along an axis, said one dimensional intensity projection signal having a plurality of corresponding peaks;

(D) means for calculating the areas of a plurality of regions described by said one dimensional intensity projection signal, wherein each of said areas is bounded by a portion of said one dimensional intensity projection signal and said axis, said portion lying between corresponding peaks of said one dimensional projection signal; and (E) means for determining the widths of a plurality of bars in said bar code symbol from said areas.

8. The apparatus of claim 7, wherein said means for forming further comprises:
   (1) means for determining from said projection signal a minimum global scaling parameter and a maximum global scaling parameter; and
   (2) means for globally scaling said projection signal in accordance with said minimum and maximum global scaling values.

9. The apparatus of claim 8, wherein said means for selecting comprises:
   (a) means for determining a plurality of local minimum values from said projection signal;
   (b) means for determining said minimum global scaling parameter from an average of said plurality of local minimum values;
   (c) means for determining a plurality of local maximum values from said projection signal; and
   (d) means for determining said maximum global scaling parameter from an average of said plurality of local maximum values.

10. The apparatus of claim 9, wherein said means for forming further comprises:
    (3) means for locally scaling said projection signal in accordance with said local minimum and local maximum values.

11. The apparatus of claim 10, wherein said means for locally scaling comprises:
    (a) means for positioning a sliding window on said projection signal;
    (b) means for calculating a contrast value for pixels in said window;
    (c) means for comparing said contrast value to a predetermined threshold;
    (d) means for locally scaling pixels in said window if said contrast value exceeds said predetermined threshold;
    (e) means for marking pixels in said window as undefined if said contrast value does not exceed said predetermined threshold; and
    (f) means for resolving by linear interpolation pixels marked undefined.

12. The apparatus of claim 7, wherein said two dimensional digital image is representative of a corrupted bar code symbol.

13. The method of claim 1, wherein said plurality of intensity information values are determined in step (B) by summing only gray scale pixel values taken directly from said input image for each of said sections.

14. The apparatus of claim 7, wherein said means for determining a plurality of intensity information values sums only gray scale pixel values taken directly from said input image for each of said sections.

* * * * *